(No Model.) 3 Sheets—Sheet 1.

J. B. SWAIM.
CAR BRAKE AND STARTER.

No. 395,461. Patented Jan. 1, 1889.

WITNESSES:
INVENTOR:
J. B. Swaim
BY Munn & Co.
ATTORNEYS.

(No Model.) 3 Sheets—Sheet 2.

J. B. SWAIM.
CAR BRAKE AND STARTER.

No. 395,461. Patented Jan. 1, 1889.

WITNESSES:
John M. Deemer
C. Sedgwick

INVENTOR:
J. B. Swaim
BY Munn & Co.
ATTORNEYS.

(No Model.)  3 Sheets—Sheet 3.

J. B. SWAIM.
CAR BRAKE AND STARTER.

No. 395,461. Patented Jan. 1, 1889.

WITNESSES:
John N. Deemer
C. Sedgwick

INVENTOR:
J. B. Swaim
BY Munn & Co.
ATTORNEYS.

UNITED STATES PATENT OFFICE.

JOHN B. SWAIM, OF NEWBERN, INDIANA.

CAR BRAKE AND STARTER.

SPECIFICATION forming part of Letters Patent No. 395,461, dated January 1, 1889.

Application filed September 5, 1888. Serial No. 284,613. (No model.)

*To all whom it may concern:*

Be it known that I, JOHN B. SWAIM, of Newbern, in the county of Bartholomew and State of Indiana, have invented a new and Improved Car Brake and Starter, of which the following is a full, clear, and exact description.

This invention relates to an improvement in car brakes and starters, and has for its object to provide a car brake and starter which is simple in construction and effective in operation.

The invention consists in a car brake and starter constructed and arranged as hereinafter described and claimed.

Reference is to be had to the accompanying drawings, forming a part of this specification, in which similar figures of reference indicate corresponding parts in all the figures.

Figure 1:
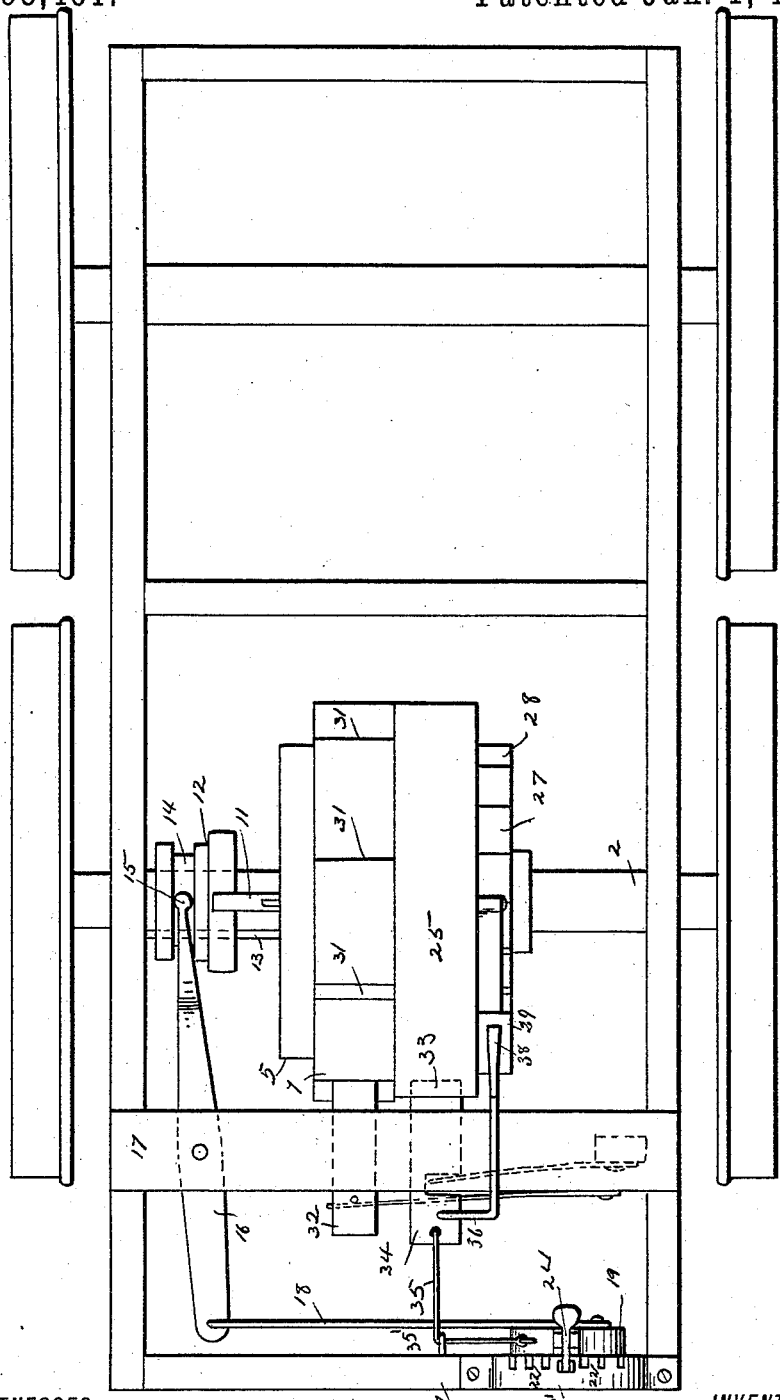
Figure 2:
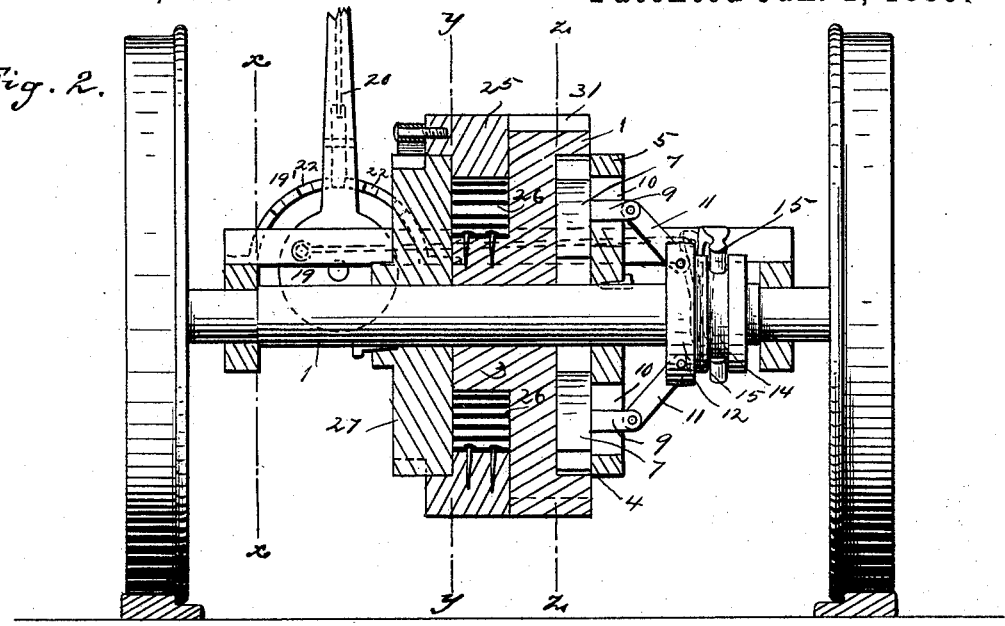
Figure 3:
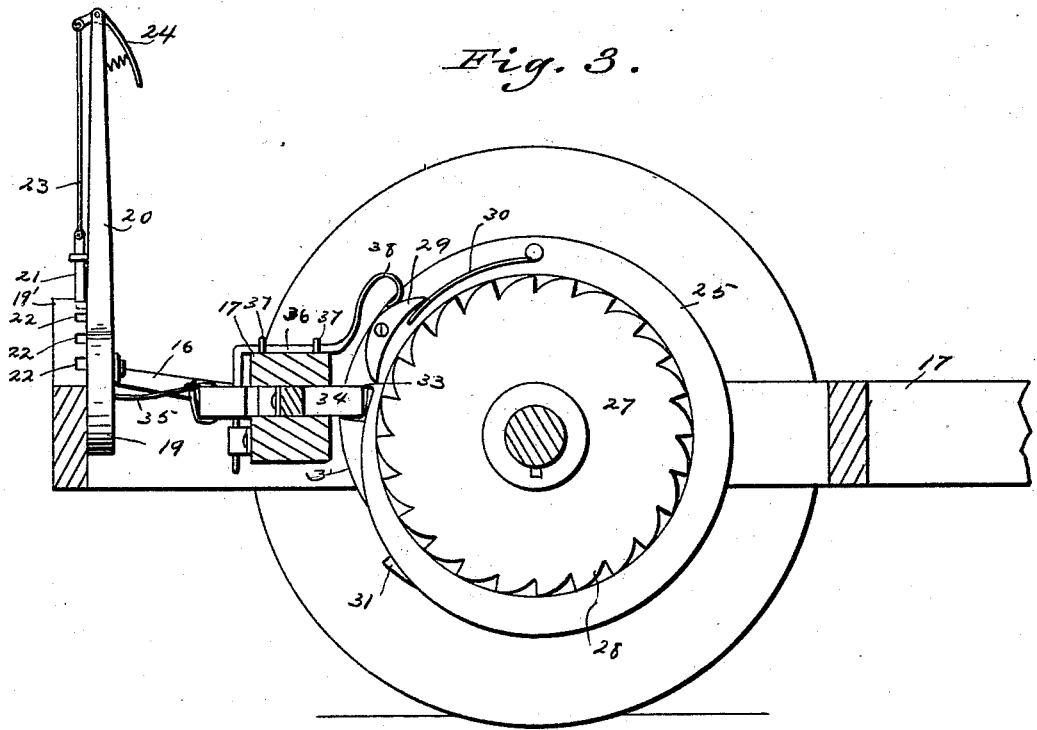
Figure 4:
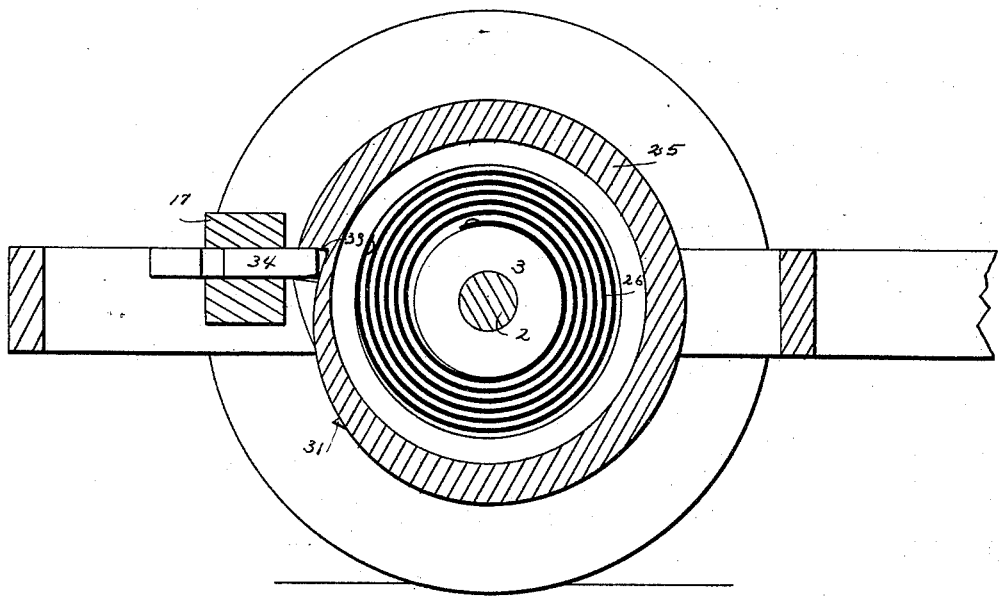
Figure 5:
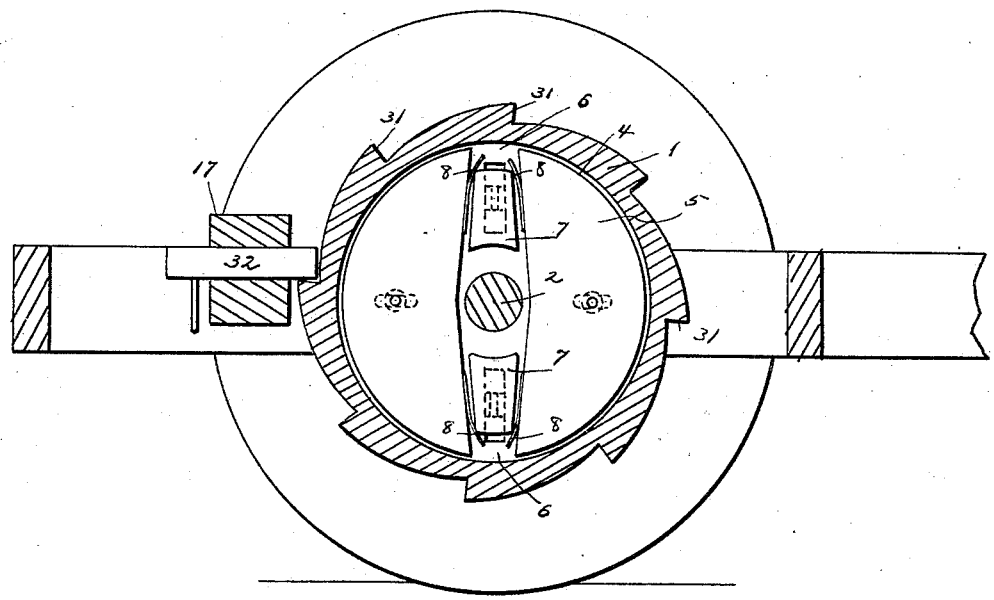

Figure 1 is a plan view of the invention. Fig. 2 is an end view of the invention with parts in vertical section. Fig. 3 is a side view in vertical section on the line $xx$, Fig. 2. Fig. 4 is a side view in vertical section on the line $yy$, Fig. 2; and Fig. 5 is a side view in vertical section on the line $zz$, Fig. 2.

In carrying out this invention a disk, 1, is rigidly mounted on the axle 2 of a car, and is formed on one side with a projection, 3, encircling the axle 2, and on the other with a circular recess, 4, into which projects the inner half of a disk, 5, having a passage, 6, extending diametrically across the disk 5. In the passage are located sliding friction-blocks 7, adapted to be moved outward from the center in opposite directions between friction-springs 8, so as to bear against the periphery of the circular recess 4.

The blocks 7 are mounted on arms 9, projecting through slots 10 in the wall of passage 6. The arms 9 are connected by pivoted bars 11 to a sliding sleeve, 12, mounted on axle 2 and connected therewith by a spline, 13, engaging a groove in the sleeve. The latter is formed with a circular groove, 14, in which are located the pins 15 on the end of a forked lever, 16, pivoted to the car-frame 17, and having a connecting-rod, 18, eccentrically pivoted to a disk, 19, and provided with a vertical operating-lever, 20. By means of the foregoing-described mechanism the sleeve 12 is permitted to turn with the axle 2 without affecting the lever 16, and the blocks 7 can be moved in and out of frictional engagement with the disk 5, thereby serving as a friction-brake. The lever 20 is held in adjusted position by means of a pawl, 21, adapted to engage one of a series of notches, 22, in projection 19', and operated by a rod, 23, pivoted to a spring-actuated lever, 24, at the end of lever 20. Adjacent to disk 1 is a ring, 25, inclosing a coiled spring, 26, one end of which is secured to the projection 3 and the other to the ring 25.

On the outside of ring 25 is located a disk, 27, fitting loosely into the ring and secured to shaft 2 and having a toothed periphery, 28, with which a pawl, 29, is normally held in engagement by means of a spring, 30, to hold the ring 25 from being turned backward by the force of spring 26. When the car-starter is not in use, disk 5, ring 25, spring 26, and disk 27 turn in the same direction with shaft 2. The disk 1 is formed on its periphery with teeth 31, with which a spring-actuated pawl, 32, engages, and the ring 25 has a single tooth, 33, facing in the opposite direction to teeth 31. In the car-frame 17 is located a spring-actuated pin, 34, which is held in engagement by its spring with tooth 33.

The pin 34 is connected by a cord, 35, passing through ring 3 and secured to the periphery of disk 17, so that when the lever 20 is moved back to release the friction-blocks 7 the pin 34 is drawn out of engagement with tooth 33. The pin 34 has mounted thereon a bent arm, 36, extending through guides 37 on the frame 17 and having a curved end, 38, which bears against one end of pawl 29 to hold it against the tension of spring 30, out of engagement with teeth 28. Upon the pin 34 being released from tooth 33 the arm 35 is withdrawn from pawl 19, and the latter is thereupon thrown into engagement with teeth 28 by means of spring 30, thereby holding the ring from being revolved forward by spring 26.

In operation, upon the lever 20 being moved to the right the blocks 7 are thrown into frictional engagement with disk 5, thereby serving as a brake for the car, and the cord 35 being slackened the pin 34 is moved by its spring into engagement with tooth 33 on ring 25, and pawl 29 is held out of engagement with teeth 28. In the revolution of the axle 2 the disk 1 rotates in the same direction therewith and the teeth 31 slip past the pawl 32. The ring 25 being held by pin 34, the spring 26 is thereby wound up. Upon the car being brought to a standstill the spring 26 will be wound up and ready to act to move the car forward, it being held from action by the pin 34, holding ring 25, and the pawl 32, holding disk 1. To start the car, the lever 20 is moved back, which releases the friction-blocks 7 and the pin 34 and throws pawl 29 into engagement with teeth 28. The spring 26 is thereupon free to turn the axle 2 forward and the car will be moved forward. The movement of the car starter and brake may be regulated by the adjustment of lever 20, by means of its pawl 21 being thrown into and out of engagement with the different notches 22 in projection 19'.

This invention, in addition to starting a car, is also useful in assisting the car over upgrades, as the spring 26 may be utilized similarly to its use in starting the car to propel the car up an ascent.

It will thus be seen that with a car starter and brake of this description a powerful and effective means is provided for readily stopping and starting a car and assisting it over upgrades.

Having thus described my invention, what I claim as new, and desire to secure by Letters Patent, is—

1. A car starter and brake consisting of a toothed disk mounted on a car-axle, a pawl on the car-frame engaging the toothed disk, a second toothed disk mounted on the car-axle, a ring loosely mounted on the second toothed disk, located between the toothed disks and having a spring-actuated pawl adapted to engage the second toothed disk, a coiled spring located within the ring and having one end secured thereto and the other to the first toothed disk, a spring-actuated pin and arm on the car-frame adapted to hold the ring from turning in the same direction with first toothed disk, and holding the pawl of the ring out of engagement with second toothed disk, a sleeve movable lengthwise on the car-axle and having sliding friction-blocks adapted to engage the first toothed disk, and a lever mechanism for operating the ring-engaging pin, the pawls of toothed disks and the friction-blocks and their disk on the axle, substantially as shown and described.

2. In a car starter and brake, toothed disks mounted on a car-axle, a loose ring located between the toothed disks and inclosing a coiled spring having one end secured to the ring and the other to one of the toothed disks, a spring-actuated pawl for holding one of the disks from turning in one direction, a spring-actuated pin and sliding arm on the said pin, and a spring-pawl on the ring for holding the latter from turning in the opposite direction to toothed disk connected with the coiled spring, and a lever mechanism for disengaging the ring from the car-frame and engaging it with the second toothed disk, substantially as shown and described.

3. The combination, with disk 1, having teeth 31, and spring-pawl 32, disk 27, with teeth 28, ring 25, loosely mounted on disk 27, and having tooth 33 and spring-pawl 29, and spring 26, connected at one end to ring 25 and at the other to disk 1, of lever 20, with spring-pawl 21, disk 19, cord 35, and sliding spring-pin 34, with bent arm 36, adapted to engage ring 25, and pawl 29, substantially as shown and described.

4. The combination, with disk 1, of disk 5, projecting into disk 1 and having sliding friction-blocks 7, adapted to bear against disk 1, with arms 9, pivoted bars 11, sleeve 12, connected by spline 13 to axle 2 and movable laterally thereon, and having circular groove 14, and forked lever 16, engaging groove 14, connecting-rod 18, and lever 20, with spring-pawl 21, and the disk 19, to which rod 18 is eccentrically pivoted, substantially as shown and described.

5. The disk 1, with teeth 31 and spring-pawl 32, disk 27, with teeth 28, ring 25, loosely mounted on disk 27 and having tooth 23 and spring-pawl 29, spring 26, connected at one end to ring 25 and at the other to disk 1, disk 5 projecting into disk 1 and having sliding friction-blocks 7, adapted to bear against disk 1 with arms 9, pivoted bars 11, and sleeve 12, movable laterally on axle 2 and having circular groove 14, in combination with lever 20, having spring-lever 24, rod 23, and pawl 21, engaging notches 22 in bar 19', disk 19, cord 35, sliding spring-pin 34, with bent arm 36, rod 18, eccentrically pivoted to disk 19, and forked lever 16, connected at one end to rod 18, and at the other having pins 15, engaging slot 14 in sleeve 12, substantially as shown and described.

JOHN B. SWAIM.

Witnesses:
T. F. McCALLIE,
ANDERSON JONES.